United States Patent
Surace et al.

(10) Patent No.: US 11,536,148 B2
(45) Date of Patent: Dec. 27, 2022

(54) VANE ARC SEGMENT WITH THERMAL INSULATION ELEMENT

(71) Applicant: RAYTHEON TECHNOLOGIES CORPORATION, Farmington, CT (US)

(72) Inventors: Raymond Surace, Newington, CT (US); Mark F. Zelesky, Bolton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/102,575

(22) Filed: Nov. 24, 2020

(65) Prior Publication Data

US 2022/0162945 A1 May 26, 2022

(51) Int. Cl.
*F01D 9/04* (2006.01)
*F01D 5/08* (2006.01)
*F01D 5/18* (2006.01)
*F01D 5/28* (2006.01)

(52) U.S. Cl.
CPC .............. *F01D 9/042* (2013.01); *F01D 5/08* (2013.01); *F01D 5/18* (2013.01); *F01D 5/284* (2013.01); *F05D 2230/18* (2013.01); *F05D 2230/90* (2013.01); *F05D 2240/80* (2013.01); *F05D 2260/231* (2013.01)

(58) Field of Classification Search
CPC ..... F01D 9/00; F01D 9/02; F01D 9/04; F01D 9/041; F01D 9/042; F01D 5/08; F01D 5/18; F01D 5/28; F01D 5/282; F01D 5/284; F05D 2230/18; F05D 2240/80; F05D 2260/231
See application file for complete search history.

(56) References Cited

U.S. PATENT DOCUMENTS

| | | | | |
|---|---|---|---|---|
| 4,273,824 A | * | 6/1981 | McComas | F01D 5/284 427/328 |
| 6,648,597 B1 | * | 11/2003 | Widrig | F01D 9/044 415/200 |
| 7,625,170 B2 | * | 12/2009 | Greene | F01D 5/30 415/110 |
| 8,956,112 B2 | | 2/2015 | Tanahashi et al. | |

(Continued)

FOREIGN PATENT DOCUMENTS

EP 1367037 12/2003

OTHER PUBLICATIONS

European Search Report for European Patent Application No. 21209704.2 dated May 25, 2022.

*Primary Examiner* — Eldon T Brockman
*Assistant Examiner* — Elton K Wong
(74) *Attorney, Agent, or Firm* — Carlson, Gaskey & Olds, P.C.

(57) ABSTRACT

A vane arc segment includes an airfoil piece that defines first and second platforms and an airfoil section that extends between the first and second platforms. The first platform defines a gaspath side, a non-gaspath side, and a first platform radial flange that projects from the non-gaspath side. Support hardware supports the airfoil piece via the first platform radial flange. A thermal insulation element is situated adjacent the first platform radial flange. The support hardware supports the airfoil piece through the thermal insulation element.

15 Claims, 3 Drawing Sheets

(56) References Cited

U.S. PATENT DOCUMENTS

| | | | |
|---|---|---|---|
| 2007/0065285 A1* | 3/2007 | Cairo | F01D 5/147 |
| | | | 416/193 A |
| 2010/0068034 A1 | 3/2010 | Schiavo et al. | |
| 2016/0376899 A1* | 12/2016 | Prugarewicz | F01D 25/005 |
| | | | 415/115 |
| 2018/0347049 A1* | 12/2018 | Oboodi | F01D 5/005 |
| 2020/0080429 A1 | 3/2020 | Vetters et al. | |
| 2020/0150616 A1 | 5/2020 | Auxier et al. | |
| 2020/0200023 A1 | 6/2020 | Whittle et al. | |
| 2020/0248569 A1 | 8/2020 | Whittle et al. | |
| 2020/0263549 A1* | 8/2020 | Delahaye | F01D 5/085 |
| 2020/0408100 A1* | 12/2020 | Whittle | F01D 9/041 |

* cited by examiner

VANE ARC SEGMENT WITH THERMAL INSULATION ELEMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil piece that defines first and second platforms and an airfoil section that extends between the first and second platforms. The first platform defines a gaspath side, a non-gaspath side, and a first platform radial flange that projects from the non-gaspath side. Support hardware supports the airfoil piece via the first platform radial flange. There is a thermal insulation element adjacent the first platform radial flange through which the support hardware supports the airfoil piece.

In a further embodiment of any of the foregoing embodiments, the airfoil piece is ceramic, the support hardware is metallic, and the first platform radial flange is an airfoil-shaped collar.

In a further embodiment of any of the foregoing embodiments, the first platform radial flange defines a radial flange face, an inner flange face facing toward the internal cavity, and an outer flange face opposed from the inner flange face. The thermal insulation element defines an inner element face facing toward the internal cavity and an outer element face opposed from the inner element face, and the outer flange face contacts the inner element face.

In a further embodiment of any of the foregoing embodiments, the support hardware is a spar piece that includes a spar platform and a leg that extends from the spar platform into the internal cavity, and the spar platform contacts the element outer face.

In a further embodiment of any of the foregoing embodiments, the thermal insulation element has a bearing face in contact with the radial flange, and the bearing face has a coating.

In a further embodiment of any of the foregoing embodiments, the coating includes at least one of hafnia, silica, silicate, or zirconia.

In a further embodiment of any of the foregoing embodiments, the thermal insulation element circumscribes the first platform radial flange and is trapped between the support hardware and the first platform radial flange.

In a further embodiment of any of the foregoing embodiments, the support hardware exclusively supports the airfoil piece through the thermal insulation element and the first platform radial flange.

A further embodiment of any of the foregoing embodiments includes an additional thermal insulation element. The second platform further includes a second platform radial flange that projects from the non-gaspath side of the second platform. The second platform radial flange defines a radial flange face, an inner flange face facing toward the internal cavity, and an outer flange face opposed from the inner flange face. The additional thermal insulation element defines an inner element face facing toward the internal cavity and an outer element face opposed from the inner element face, and the outer flange face contacts the inner element face.

In a further embodiment of any of the foregoing embodiments, relative to a radial direction of the airfoil piece the flange outer face and the element inner face are sloped.

In a further embodiment of any of the foregoing embodiments, the flange outer face and the element inner face are sloped at an angle from 10° to 50°.

A gas turbine engine according to an example of the present disclosure includes a compressor section, a combustor in fluid communication with the compressor section, and a turbine section in fluid communication with the combustor. The turbine section has vanes as in the foregoing embodiments.

A method of reducing play in a vane arc segment according to an example of the present disclosure includes performing a light scan of the radial flange to produce a digital three-dimensional model of the radial flange, and machining the thermal insulation element in accordance with the digital three-dimensional model to provide a low-tolerance fit between the radial flange and the thermal insulation element that limits play between the airfoil piece and the thermal insulation element.

In a further embodiment of any of the foregoing embodiments, the airfoil piece and the thermal insulation element are ceramic.

In a further embodiment of any of the foregoing embodiments, the light scan is a structured light scan.

In a further embodiment of any of the foregoing embodiments, the thermal insulation element includes a coating, and the machining of the thermal insulation element includes machining the coating.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
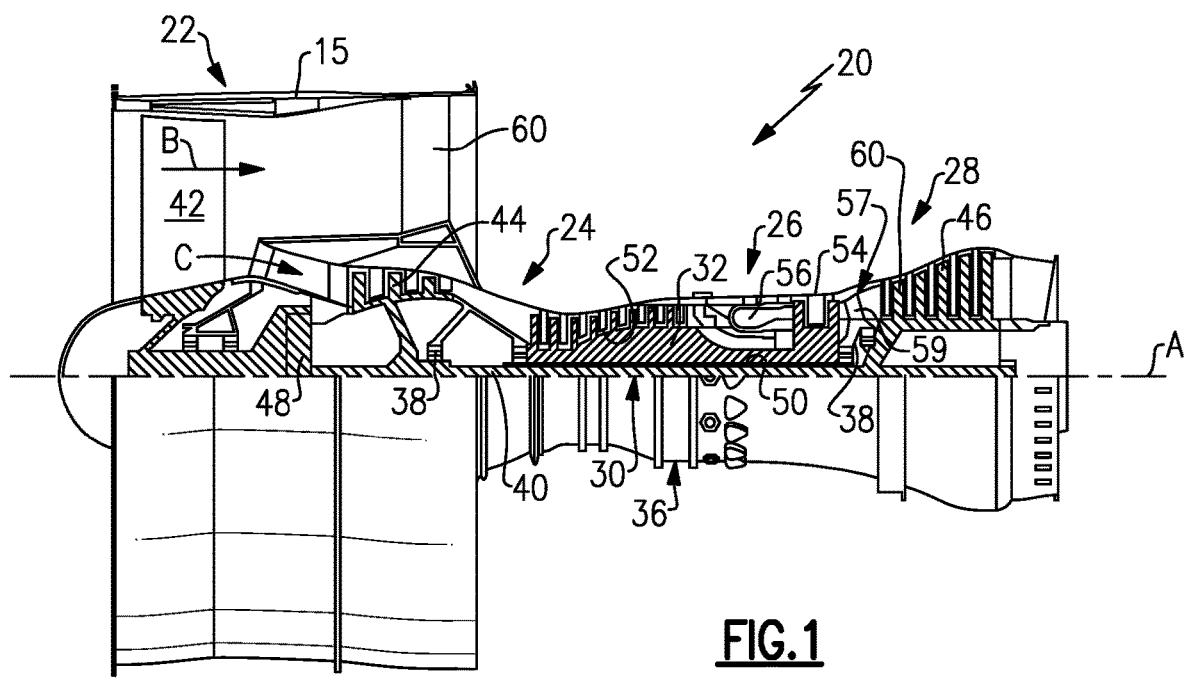
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
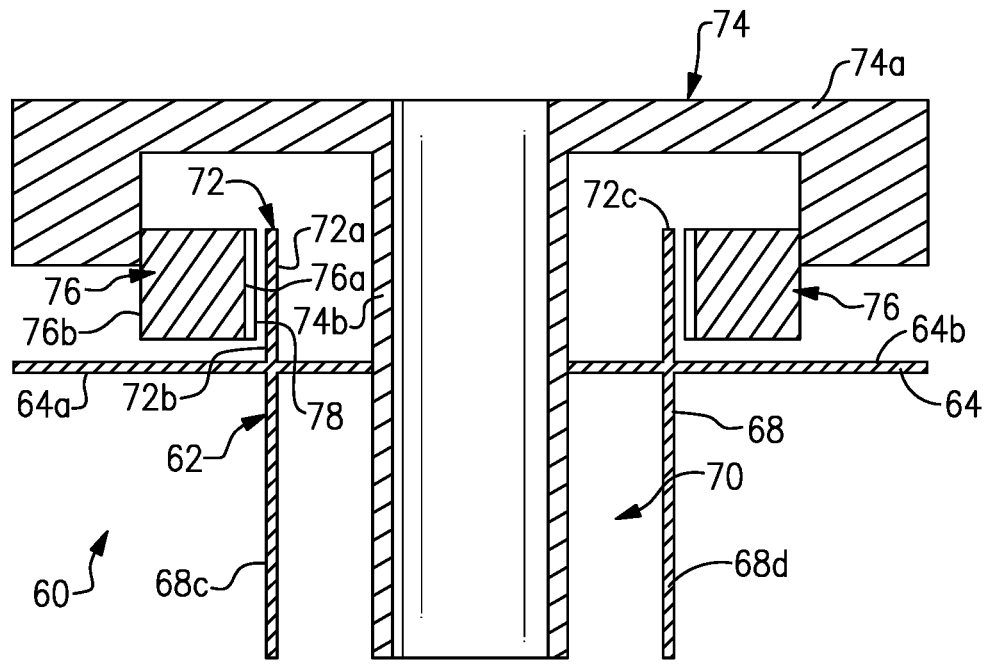
FIG. 2 illustrates a portion of a vane arc segment.

FIG. 2 illustrates a sectioned view (taken mid-chord, aft looking forward) through a portion of a vane arc segment 60 of a vane ring assembly from the turbine section 28 of the engine 20. The vane arc segments 60 are situated in a circumferential row about the engine central axis A. Although the vane arc segment 60 is shown and described with reference to application in the turbine section 28, it is to be understood that the examples herein are also applicable to structural vanes in other sections of the engine 20.

Figure 3:
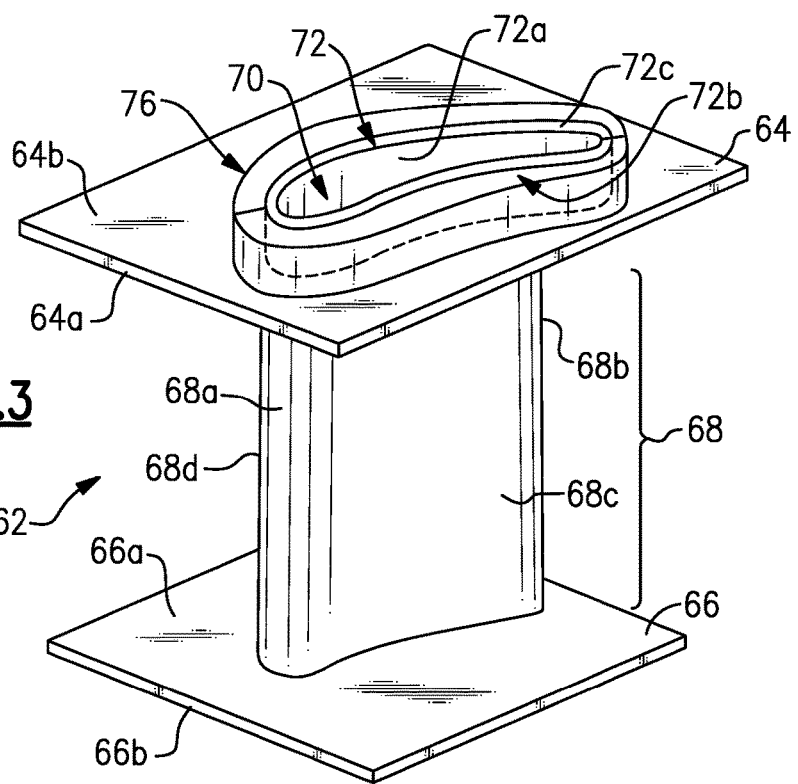
FIG. 3 illustrates an isolated view of an airfoil piece.

The vane arc segment 60 is comprised of an airfoil piece 62, which is also shown in a full isolated view in FIG. 3. The airfoil piece 62 includes several sections, including first and second platforms 64/66 and an airfoil section 68 that extends between the first and second platforms 64/66. The airfoil section 68 defines a leading edge 68a, a trailing edge 68b, and pressure and suction sides 68c/68d. The airfoil section 68 generally circumscribes an internal cavity 70 such that the airfoil section 68 in this example is hollow. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

In this example, the first platform 64 is a radially outer platform and the second platform 66 is a radially inner platform relative to the engine central longitudinal axis A. The first platform 64 defines a gaspath side 64a and a non-gaspath side 64b. Likewise, the second platform 66 defines a gaspath side 66a and a non-gaspath side 66b. The gaspath sides 64a/66a bound the core flow path C through the engine 20.

The platform 64 further includes a radial flange 72 that projects (radially) from the non-gaspath side 64b. In this example, the flange 72 is an airfoil-shaped collar that is in essence an extension of the airfoil section 68 radially past the platform 64. It is to be appreciated, however, that the examples herein may be applied to flanges having other geometries that are also the exclusive load-transmitting attachments of an airfoil piece. The flange 72 defines an inner face 72a that generally faces toward the internal cavity 70, an opposed outer face 72b, and a radial face 72c. The flange 72 serves to transfer loads, such as aerodynamic forces, from the airfoil piece 62 to support hardware 74. Likewise, the platform 66 may also include a flange (not shown) that engages support hardware. The airfoil piece 62 is supported exclusively through the flanges 72, i.e., the flanges are the exclusive load-transmitting attachments of the airfoil piece 62.

The airfoil piece 62 is continuous in that the platforms 64/66 and airfoil section 68 constitute a one-piece body. As an example, the airfoil piece 62 is formed of a ceramic material, an organic matrix composite (OMC), or a metal matrix composite (MMC). For instance, the ceramic material is a monolithic ceramic or a ceramic matrix composite (CMC) that is formed of ceramic fibers that are disposed in a ceramic matrix. The monolithic ceramic may be, but is not limited to, SiC or other silicon-containing ceramic. The ceramic matrix composite may be, but is not limited to, a SiC/SiC ceramic matrix composite in which SiC fibers are disposed within a SiC matrix. Example organic matrix composites include, but are not limited to, glass fiber, carbon fiber, and/or aramid fibers disposed in a polymer matrix, such as epoxy. Example metal matrix composites include, but are not limited to, boron carbide fibers and/or alumina fibers disposed in a metal matrix, such as aluminum. The fibers may be provided in fiber plies, which may be woven or unidirectional and may collectively include plies of different fiber weave configurations.

The airfoil piece 62 is mounted between support hardware 74 at both the inner and outer diameter ends of the airfoil piece. In the example of FIG. 2, the support hardware 74 is a spar that includes a spar platform 74a and a leg 74b. The leg 74b extends radially from the spar platform 74a through the internal cavity 70 of the airfoil section 68. The leg 74b may extend radially past the second platform 66, where it is secured with the support hardware at the inner diameter. In this example, the leg 74b is hollow and may be provided with pass-through air for cooling downstream components and/or cooling air used to cool a portion of the airfoil piece 62. The support hardware 74 is formed of a metallic alloy that can bear the loads received, such as nickel- or cobalt-based superalloys.

In general, the materials contemplated for the airfoil piece 62 have significantly lower thermal conductivity than superalloys and do not possess the same strength and ductility characteristics, making them more susceptible to distress from thermal gradients and the thermally induced stresses those cause. The high strength and toughness of superalloys permits resistance to thermal stresses, whereas by comparison materials such as ceramics are more prone to distress from thermal stress. Thermal stresses may cause distress at relatively weak locations, such as interlaminar interfaces between fiber plies where there are no fibers carrying load. Therefore, although maximized cooling may be desirable for superalloy vanes, cooling in some locations for non-superalloy vanes may exacerbate thermal gradients and thus be counter-productive to meeting durability goals.

In particular in the vane arc segment 60, the metallic support hardware 74 is cooled by bleed air from the compressor section 24. On the other hand, the airfoil piece 62, most of which is exposed in the core gaspath of the engine 20, operates at relatively high temperatures. As a result, there is the tendency for the metallic support hardware 74 to remove heat from the airfoil piece 62, and thereby increasing thermal gradients across the flange 72 and platform 64. For example, if the flange 72 of the airfoil piece 62 were mounted to be in contact with the support hardware 74, the contact interface would serve as a thermal conductance path for heat removal. For such contact, the flange 72 would be relatively cool in the region of contact. However, since the material from which the airfoil piece 62 is formed has relatively low thermal conductivity, the flange 72 may remain relatively hot in regions that are close the region of contact.

In this regard, as shown in FIG. 2, the vane arc segment 60 includes a thermal insulation element 76 adjacent the flange 72. The thermal insulation element 76 is located between the flange 72 and the support hardware 74 such that the support hardware 74 supports the airfoil piece 62 through the thermal insulation element 76. The thermal insulation element 76 thus mechanically intervenes between the flange 72 and the support hardware 74 such that there is no direct thermal conductance path via contact. Moreover, the thermal insulation element 76 itself is formed of a low thermal conductance material and thus also limits indirect conductance from the airfoil piece 62 to the support hardware 74. In this regard, the thermal insulation element 76 serves as a mechanical load block and as a thermal insulator. For example, the thermal insulation element 76 is selected from the materials discussed above for the airfoil piece 62. In the turbine section 28, however, the thermal insulation element 76 is ceramic, such as the monolithic ceramic or CMC discussed above.

Referring also to FIG. 3, the thermal insulation element 76 circumscribes the flange 72. In this example, the thermal insulation element 76 is a two-piece split ring. It is to be understood, however, that the thermal insulation element 76 could alternatively be provided in more pieces, or as a single piece. The thermal insulation element 76 defines an inner face 76a that generally faces toward the internal cavity 70 of the airfoil piece 62 and an opposed outer face 76b. The inner face 76a serves as a bearing face that is in contact with the outer face 72b of the flange 72. The outer face 76b also serves as a bearing face and is in contact with the spar platform 74a. The thermal insulation element 76 is thus trapped between the spar platform 74a and the flange 72. For example, the thermal insulation element 76 is otherwise unsecured, via bonding or the like, to either the airfoil piece 62 or the support hardware 74.

Optionally, the thermal insulation element 76 includes a coating 78 on its inner face 76a. The coating 78 serves to provide a relatively smooth, low-wear contact surface for engagement with the flange 72. The coating 78 may also serve for additional thermal insulation. As examples, the coating 78 may be formed of or include hafnia, silica, silicate, or zirconia.

Figure 4:
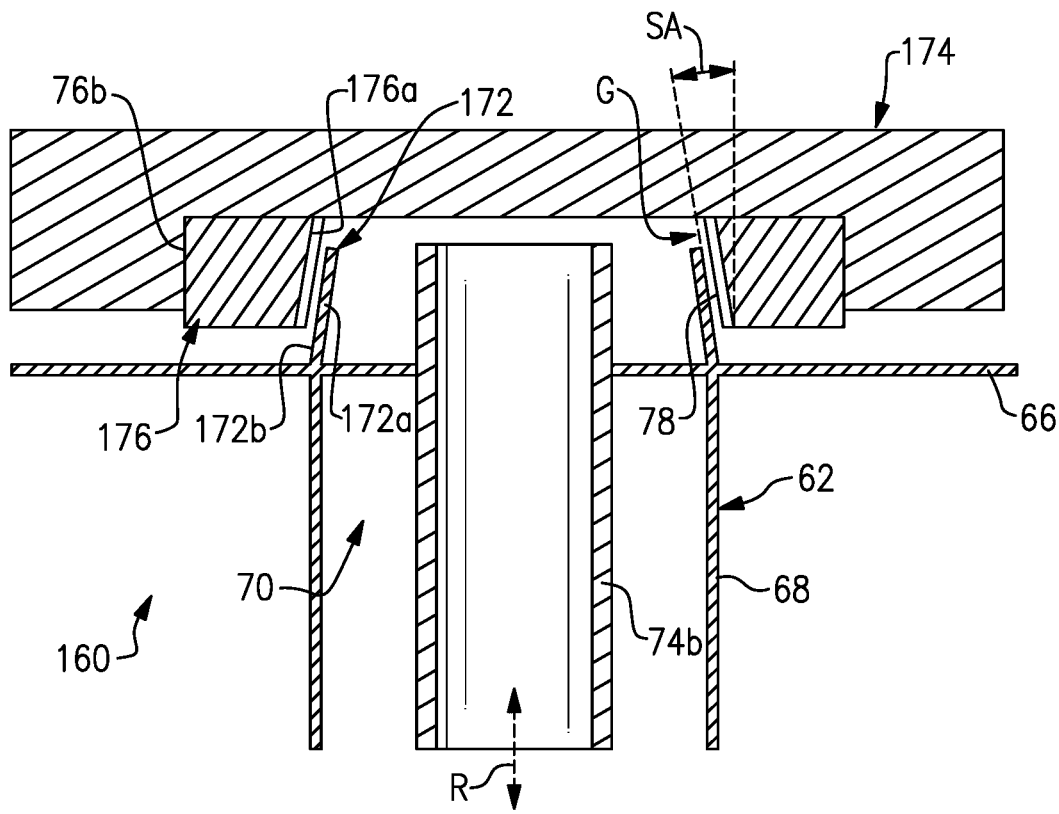
FIG. 4 illustrates a portion of another example vane arc segment.

The example in FIG. 2 is at the outer diameter end of the vane arc segment 60. It is to be understood that it may also be applied to the inner diameter end. Likewise, FIG. 4 shows an inner diameter end of a portion of another example vane arc segment 160 but may alternatively be applied to the outer diameter end. In this disclosure, like reference numerals designate like elements where appropriate and reference numerals with the addition of one-hundred or multiples thereof designate modified elements that are understood to incorporate the same features and benefits of the corresponding elements.

In the example in FIG. 4, relative to a radial direction (R) of the airfoil piece 62, the flange 172 is sloped such that its inner and outer faces 172a/172b are sloped. The inner face 176a of the thermal insulation element 176 is also sloped such that the faces 172b/176a meet at a sloped interface. For instance, both faces 172a/176a are sloped at an angle (SA) of 10° to 50°. Additionally, the there is a gap G between the tip of the flange 172 and the support hardware 174 such that the airfoil piece 62 does not bottom out in contact with the support hardware 174. Thus, all of the load transmitted from the airfoil piece 62 to the support hardware 74 is transmitted through the sloped interface. The effect of such transmission through the sloped interface is that the thermal insulation element 176 receives aerodynamic radial, tangential and axial loads, which places the thermal insulation element 176 in compression relative to the engine radial, axial and tangential directions.

Figure 5:
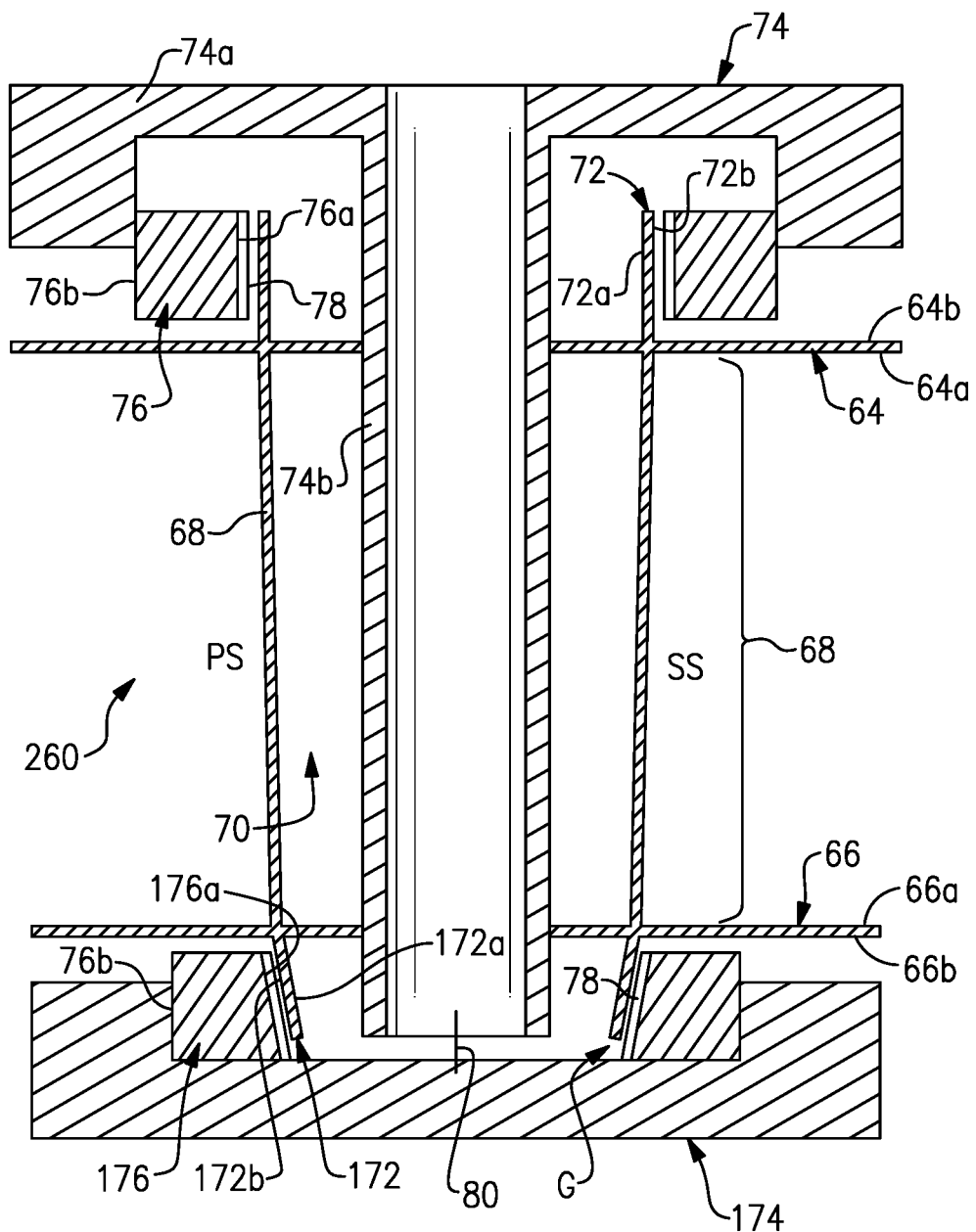
FIG. 5 illustrates another example vane arc segment.

FIG. 5 shows a further example vane arc segment 260 that is a combination of the examples of FIGS. 2 and 4, whereby the above discussions of each are hereby incorporated into the present example. In this example, relative to the engine central axis A, the support hardware 74 is outer diameter support hardware, the support hardware 174 is inner diameter support hardware, and the leg 74*b* is secured to the support hardware 174, such as by fastener 80. The fastener 80 is not particularly limited and may be, but is not limited to, a lock pin.

The thermal insulation element 76/176 also provides a method for reducing play in the vane arc segment 60/160/260. In particular, the position of the airfoil piece 62 relative to the fixed support hardware 74/174 affects the flow area between adjacent airfoil sections 68 and aerodynamic loading on the vane arc segments 60. For instance, if there is play (free motion) between the airfoil piece 62 and the support hardware 74/174, aerodynamic loading may cause the airfoil piece 62 to rotate slightly, which could alter the flow area and aerodynamic loads. Thus, reducing play facilitates reductions in variations of the flow area and aerodynamic loading.

An example method of reducing play includes performing a light scan of the radial flange 72/172 to produce a digital three-dimensional model of the radial flange 72/172. For example, the light scan involves a structured light scan, such as by blue light. The digital three-dimensional model of the radial flange 72/172 may be used to verify that the flange 72/172 meets dimensional tolerances. The digital three-dimensional model, however, may also be used in the fabrication of the thermal insulation element 76/176. In this regard, the thermal insulation element 76/176 is machined in accordance with the digital three-dimensional model to provide a low-tolerance fit between the radial flange 72/172 and the thermal insulation element 76/176 that limits play.

As an example, a surface of one component has subtle variations in contour, while a surface of a mating component does not typically have the same contours. As a result, there are variations of how the surfaces mate from part-to-part, and the components must be made with tolerances to account for such variations and ensure fit.

The surface contours of the flange 72/172, however, are represented in the digital three-dimensional model. Thus, the mating surface of the thermal insulation element 76/176 is machined to match the contours of the flange 72/172. Since the contours of the mating surfaces match, there is a closer fit. With such a closer fit, tolerances can be reduced, which ultimately reduces play. It is to be understood that for purposes herein the coating 78, if used, is considered to be a part of the thermal insulation element 76/176. Thus, the inner face 76*a*/176*a* of the thermal insulation element 76/176 may be machined or, if the coating 78 is used, the coating 78 may be machined. That is, the machining of the thermal insulation element 76/176 can be done after insulating coating 78 is applied.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
   an airfoil piece defining first and second platforms and an airfoil section having an internal cavity and extending between the first and second platforms, the first platform defining a gaspath side, a non-gaspath side, and a first platform radial flange projecting from the non-gaspath side;
   support hardware supporting the airfoil piece via the first platform radial flange;
   a thermal insulation element adjacent the first platform radial flange through which the support hardware supports the airfoil piece, the thermal insulation element isolating the airfoil piece from the support hardware such that there is no direct contact interface between the first platform and the support hardware; and
   an additional thermal insulation element, wherein the second platform further comprises a second platform radial flange that projects from a non-gaspath side of the second platform, the second platform radial flange defines a radial flange face, an inner flange face facing toward the internal cavity, and an outer flange face opposed from the inner flange face, the additional thermal insulation element defines an inner element face facing toward the internal cavity and an outer element face opposed from the inner element face, and the outer flange face contacts the inner element face, the second platform radial flange converges such that the internal cavity narrows between the second platform radial flange, and relative to a radial direction of the airfoil piece the outer flange face and the inner element face are sloped.

2. The vane arc segment as recited in claim 1, wherein the airfoil piece is ceramic, the support hardware is metallic, and the first platform radial flange is an airfoil-shaped collar.

3. The vane arc segment as recited in claim 1, wherein the first platform radial flange defines a radial flange face, an inner flange face facing toward the internal cavity, and an outer flange face opposed from the inner flange face of the first platform radial flange, the thermal insulation element defines an inner element face facing toward the internal cavity and an outer element face opposed from the inner element face of the thermal insulation element, and the outer flange face of the first platform radial flange contacts the inner element face of the thermal insulation element.

4. The vane arc segment as recited in claim 3, wherein the support hardware is a spar piece that includes a spar platform and a leg that extends from the spar platform into the internal cavity, and the spar platform contacts the outer element face of the thermal insulation element.

5. The vane arc segment as recited in claim 1, wherein the thermal insulation element has a bearing face in contact with the first platform radial flange, and the bearing face has a coating.

6. The vane arc segment as recited in claim 5, wherein the coating includes at least one of hafnia, silica, silicate, or zirconia.

7. The vane arc segment as recited in claim 1, wherein the thermal insulation element circumscribes the first platform radial flange and is trapped between the support hardware and the first platform radial flange.

8. The vane arc segment as recited in claim 1, wherein the support hardware exclusively supports the airfoil piece through the thermal insulation element and the first platform radial flange.

9. The vane arc segment as recited in claim 1, wherein the outer flange face of the second radial platform flange and the inner element face of the additional thermal insulation element are sloped at an angle from 10° to 50°.

10. The vane arc segment as recited in claim 1, wherein the thermal insulation element is a split ring.

11. The vane arc segment as recited in claim 1, wherein the second platform radial flange incudes a radial face, and there is a gap between the radial face and the support hardware such that the airfoil piece does not bottom out in contact with the support hardware.

12. A gas turbine engine comprising:
a compressor section;
a combustor in fluid communication with the compressor section; and
a turbine section in fluid communication with the combustor, the turbine section having vanes disposed about a central axis of the gas turbine engine, each of the vanes includes:
an airfoil piece defining first and second platforms and an airfoil section having an internal cavity and extending between the first and second platforms, the first platform defining a gaspath side, a non-gaspath side, and a first platform radial flange projecting from the non-gaspath side,
support hardware supporting the airfoil piece via the first platform radial flange,
a thermal insulation element adjacent the first platform radial flange and through which the support hardware supports the airfoil piece, the thermal insulation element isolating the airfoil piece from the support hardware such that there is no direct contact interface between the first platform and the support hardware, and
an additional thermal insulation element, wherein the second platform further comprises a second platform radial flange that projects from a non-gaspath side of the second platform, the second platform radial flange defines a radial flange face, an inner flange face facing toward the internal cavity, and an outer flange face opposed from the inner flange face, the additional thermal insulation element defines an inner element face facing toward the internal cavity and an outer element face opposed from the inner element face, and the outer flange face contacts the inner element face, the second platform radial flange converges such that the internal cavity narrows between the second platform radial flange, and relative to a radial direction of the airfoil piece the outer flange face and the inner element face are sloped.

13. The gas turbine engine as recited in claim 12, wherein the airfoil piece is ceramic, the support hardware is metallic, and the first platform radial flange is an airfoil-shaped collar.

14. The gas turbine engine as recited in claim 13, wherein the first platform radial flange defines a radial flange face, an inner flange face facing toward the internal cavity, and an outer flange face opposed from the inner flange face of the first platform radial flange, the thermal insulation element defines an inner element face facing toward the internal cavity and an outer element face opposed from the inner element face of the thermal insulation element, and the outer flange face of the first platform radial flange contacts the inner element face of the thermal insulation element.

15. The gas turbine engine as recited in claim 14, wherein the support hardware is a spar piece that includes a spar platform and a leg that extends from the spar platform into the internal cavity, the spar platform contacts the outer element face of the thermal insulation element, the thermal insulation element has a bearing face in contact with the first platform radial flange, and the bearing face has a coating.

* * * * *